US008684748B1

(12) United States Patent
Pogodin et al.

(10) Patent No.: US 8,684,748 B1
(45) Date of Patent: Apr. 1, 2014

(54) SYSTEM AND METHOD FOR PLAYING WEB-BASED TRAINING CONTENT ON A CLIENT COMPUTER SYSTEM

(75) Inventors: Andrey Pogodin, San Mateo, CA (US); Roshini Unni, Redwood City, CA (US); Land Ormiston, San Francisco, CA (US)

(73) Assignee: Saba Software, Inc., Redwood Shores, CA (US)

( * ) Notice: Subject to any disclaimer, the term of this patent is extended or adjusted under 35 U.S.C. 154(b) by 1241 days.

(21) Appl. No.: 11/499,138

(22) Filed: Aug. 3, 2006

Related U.S. Application Data

(60) Provisional application No. 60/741,275, filed on Nov. 30, 2005.

(51) Int. Cl.
*G09B 25/00* (2006.01)

(52) U.S. Cl.
USPC ............................ 434/365; 434/362; 434/323

(58) Field of Classification Search
USPC .......... 434/232, 350, 323, 322, 307 A, 307 R, 434/362, 365
See application file for complete search history.

(56) References Cited

U.S. PATENT DOCUMENTS

| 6,654,748 | B1 * | 11/2003 | Rabung et al. .................. 707/10 |
| 6,688,891 | B1 * | 2/2004 | Sanford ........................ 434/365 |
| 7,044,741 | B2 * | 5/2006 | Leem ............................ 434/156 |
| 7,153,137 | B2 * | 12/2006 | Altenhofen et al. .......... 434/118 |
| 8,260,656 | B1 * | 9/2012 | Harbick et al. .............. 705/7.31 |
| 8,554,129 | B2 * | 10/2013 | Timbadia et al. ............. 434/350 |
| 2003/0232318 | A1 * | 12/2003 | Altenhofen et al. .......... 434/362 |
| 2005/0053908 | A1 * | 3/2005 | Satheesh et al. ............. 434/350 |
| 2005/0136388 | A1 * | 6/2005 | de Saint-Aignan et al. .. 434/350 |

* cited by examiner

*Primary Examiner* — Peter Egloff

(57) ABSTRACT

A method and system for playing web-based training content on a client computer system are provided. The method includes accessing previously downloaded web-based training content stored in a first memory coupled to the client computer system and playing a portion of the web-based training content on the client computer system while the client computer system is offline. The method further includes storing results associated with playing the portion of the web-based training content in a second memory coupled to the client computer system. The method further includes, in response to detecting the client is online, synchronizing results of the playing with a host computer system.

27 Claims, 6 Drawing Sheets

SYSTEM AND METHOD FOR PLAYING WEB-BASED TRAINING CONTENT ON A CLIENT COMPUTER SYSTEM

RELATED U.S. PATENT APPLICATIONS

This patent application claims the benefit of U.S. Provisional Application No. 60/741,275, filed on Nov. 30, 2005, entitled "SCORM-Based Offline Player," by Pogodin et al.

TECHNICAL FIELD

The present invention is related to the field of learning management systems (LMS). More particularly, embodiments of the present invention are related to a web-based training (WBT) system including a Sharable Courseware Object Reference Model (SCORM) based offline player.

BACKGROUND ART

In early stages, computer-based training (CBT) was delivered from a large central computer to thin-client terminals. This implementation required that users of the CBT come to a learning center (or test center) to use the CBT which proved inconvenient for many users.

In recent years, CBT has been offered offline, typically using CD-ROMS or other portable data storage devices to provide the content of the training. Offering CBT offline (and/or away from a dedicated test center), allowed training content to be delivered to the user and allowed the user to access the material at his/her own pace and location. Furthermore, offline CBT can utilize the full multimedia functionality, including animation, sound and video of the user's computer system which further enhanced the user's experience. Some problems with offline CBT include difficulties updating course material, reporting of user's scores, updating user's transcripts, costs of supplying materials, etc.

To overcome many of the problems associated with offline training, web-based training was developed. Web-based training is distributed online over an intranet or the world-wide-web and can be run in a web browser, for example. When first implemented, a proprietary learning management system was used to launch each of the different WBT programs.

Sharable Courseware Object Reference Model (SCORM) is a standard that is implemented by a LMS that can launch compatible learning content, keep track of learner progress, determines sequence of learning objects and reports user scores. Using the SCORM standard significantly streamlined WBT because it eliminated the need for storing multiple proprietary LMS on a user's computer.

SCORM-based WBT may be problematic in cases when a user is not connected to a network (e.g., when on a plane) because delivery of updates and reporting of user data cannot be performed offline.

SUMMARY

A method for playing web-based training content on a client computer system is provided. The method includes accessing previously downloaded web-based training content stored in a first memory coupled to the client computer system and playing a portion of the web-based training content on the client computer system while the client computer system is offline. The method further includes storing results associated with playing the portion of the web-based training content in a second memory coupled to the client computer system. The method further includes, in response to detecting the client is online, synchronizing results of the playing with a host computer system.

More specifically, an embodiment of the present invention is directed to a computer implemented method of playing web-based training content on a client computer system comprising: accessing previously downloaded web-based training content stored in a first memory coupled to the client computer system; playing a portion of the web-based training content on the client computer system while the client computer system is offline; and storing results associated with playing the portion of the web-based training content in a second memory coupled to the client computer system. Embodiments also include the above and further comprising: in response to detecting the client is online, synchronizing results of the playing with a host computer system and updating a training transcript associated with the client.

Embodiments also include a system for offline web-based training comprising: a generic training content player for playing web-based training content on a client computer system while the client computer system is offline; a downloader for downloading web-based training content and storing the web-based content in a first memory coupled to a client computer system; an off-line play handler for storing results associated with playing off-line a portion of the web-based training content in a second memory coupled to the client computer system; and an uploader for uploading the results associated with playing off-line a portion of the web-based training content to a host computer system in response to detecting a connection between the client computer system and the host computer system.

Embodiments include the above system and wherein the downloader automatically downloads updates to the generic training content player in response to detecting the connection between the client computer system and the host computer system. Embodiments also include the above system and wherein the downloader automatically downloads new web-based training content in response to detecting the connection between the client computer system and the host computer system. Embodiments also include the above system and wherein the downloader automatically downloads a play pattern for subsequent training based on the results in response to detecting the connection between the client computer system and the host computer system.

Embodiments are also directed to a computer implemented method for offline web-based training comprising: distributing an offline content player to a client computer system from a host computer system; distributing web-based training content to the client computer system from the host computer system; and receiving off-line play results from the client computer system in response to the client computer system connecting to the host computer system. Embodiments include the above and further comprising: automatically distributing updates to the web-based training content in response to the play results.

Embodiments include the above and wherein the web-based training content is substantially Sharable Courseware Object Reference Model (SCORM) compatible and wherein the offline content player is generic and compatible with a plurality of web-based content. Embodiments include the above and further comprising determining a subsequent play pattern of the web-based content based on the play results.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Embodiments of the present invention provide an exemplary web-based training (WBT) content player for playing WBT content while a client computer system is offline. In one embodiment of the invention, the exemplary off-line player is generic and is compatible with various forms web-based training content formats as long as they are provided in a SCORM package format.

Figure 1:
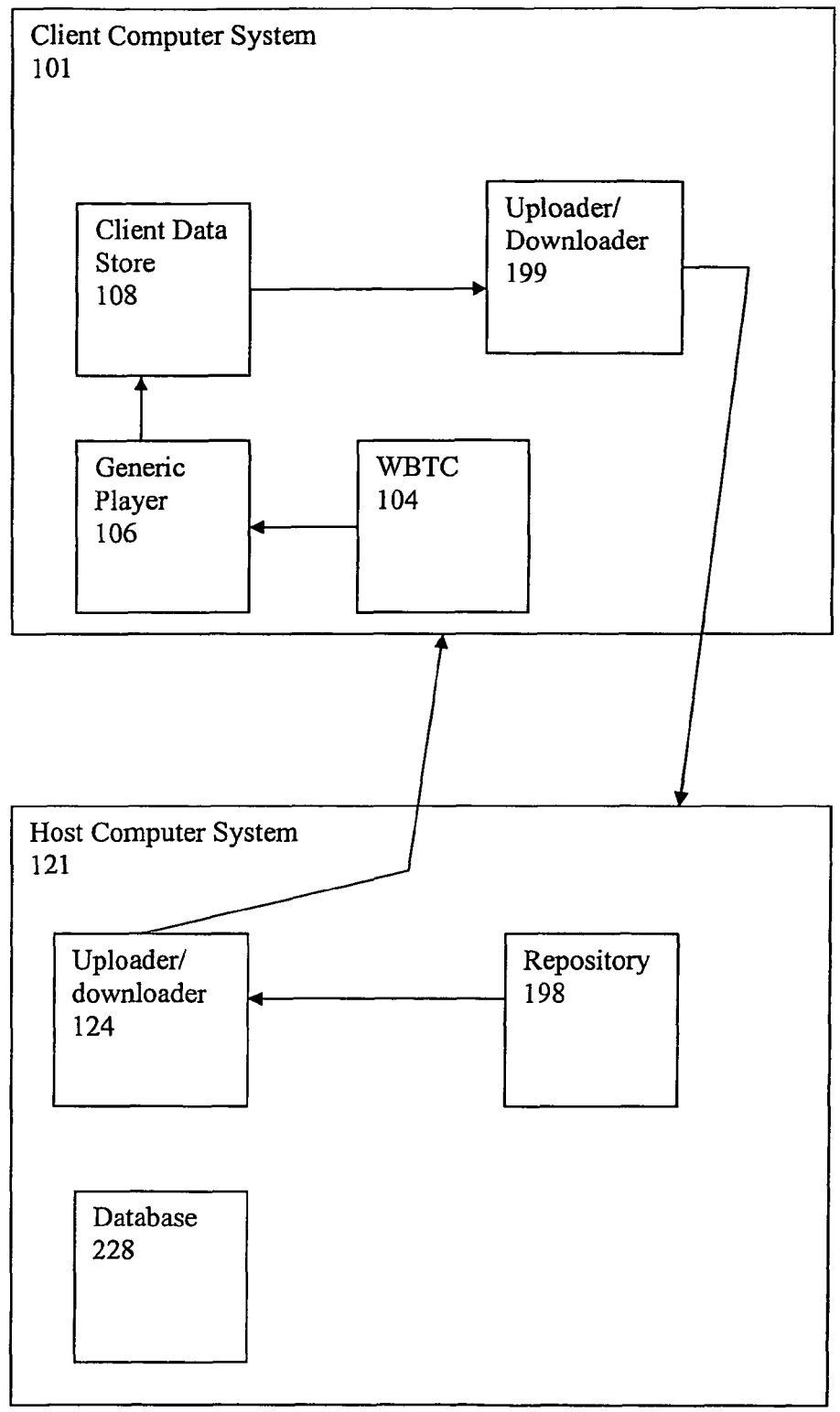
FIG. 1 is a block diagram of an exemplary system for web-based training in accordance with one embodiment of the present invention.

FIG. 1 is a block diagram of an exemplary system 100 for web-based training in accordance with one embodiment of the present invention. In one embodiment of the invention, the client computer system 101 can play web-based training content (WBTC) 104 while the client computer system 101 is off-line. In one embodiment of the invention, off-line means the client computer system 101 does not have communication with the host computer system 121. In one embodiment of the invention, the client computer system 101 can make a connection with the host computer system 121 over the Internet. However, it is appreciated that the client computer system could make a connection with the host computer system 121 in any number of ways over any number of communications media.

The client computer system 101 comprises a generic player 106 for playing the WBTC 104. In one embodiment of the invention, the generic player 106 is Sharable Courseware Object Reference Model (SCORM) compatible. In one embodiment of the invention, the client uploader/downloader 199 downloads the generic player 106 from the host computer system 121. The generic player 106 can play the WBTC while the client computer system 101 is on-line (e.g., a connection exists between the client computer system 101 and the host computer system 121) or while the client computer system 101 is off-line (e.g., a connection does not exist between the client computer system 101 and the host computer system 121). In one embodiment of the invention, the generic player operates within a Windows-based application environment.

In one embodiment of the invention, in the case a client computer system is off-line, the generic player 106 stores play results in a client data store 108. Client data store 108 can be a cache memory or any other memory device communicatively coupled to the client computer system 101. In one embodiment of the invention, play results include content played, time of play, length of play, correct answers, incorrect answers or any other play metric in accordance with embodiments of the present invention. In the case the client computer system is on-line, the play results could be stored in client data store 108 or can be directly sent to the host computer system 121.

In one embodiment of the invention, in response to detecting a connection between the client computer system 101 and the host computer system 121, the client computer system can upload the stored user play data from user data store 108 to the uploader/downloader 124 of the host computer system 121. In response to receiving the off-line play data, the host computer system 121 updates a database 228. In one embodiment of the invention, the client data comprises transcript-like information such as test scores, content completed, time spent, completion status, client objectives, or any other information associated with a particular client. In one embodiment of the invention, the host computer system 121 comprises a repository 198 for storing content such as the generic player 106 and WBTC 104 which can be uploaded to the client computer system 101.

Figure 2:
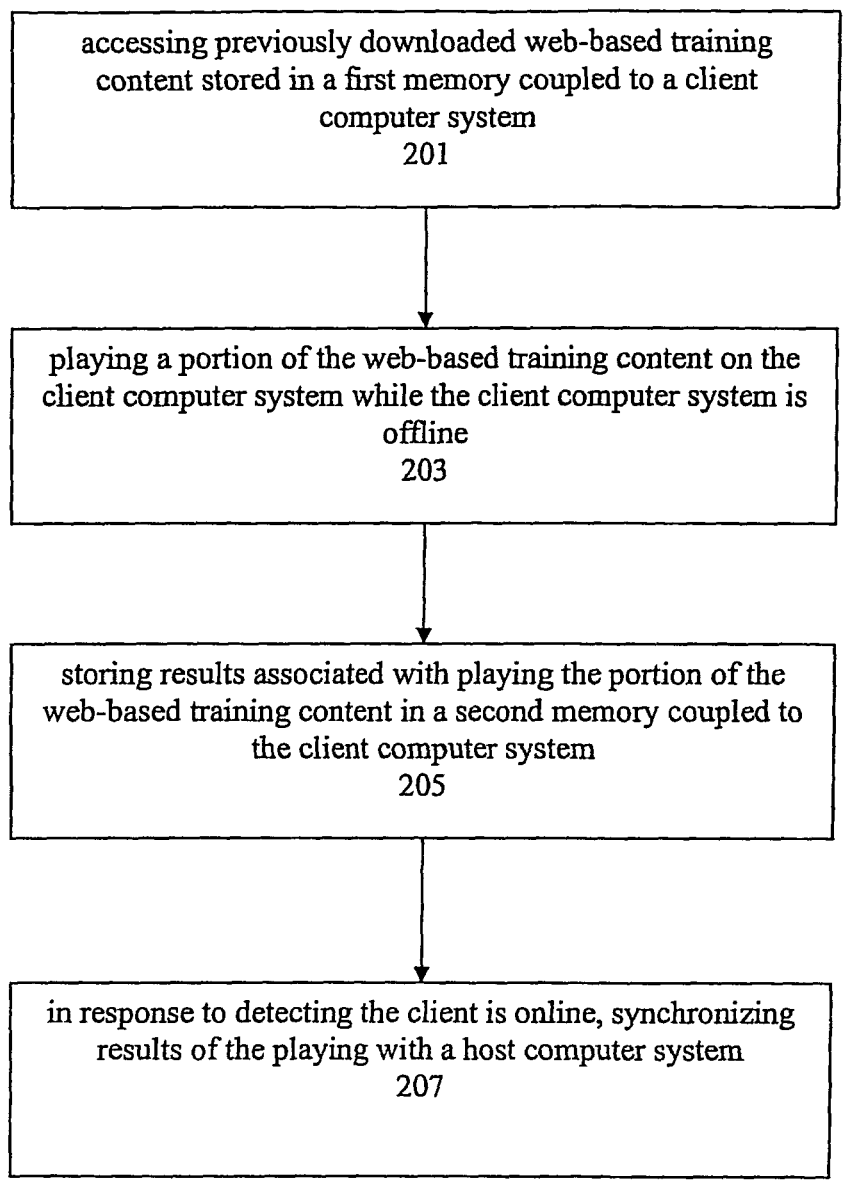
FIG. 2 is a flow diagram of an exemplary method for playing web-based training content on a client computer system in accordance with embodiments of the present invention.

FIG. 2 is a flow diagram of an exemplary computer implemented method 200 for playing web-based training content on a client computer system in accordance with embodiments of the present invention. At step 201, method 200 includes accessing previously downloaded web-based training content stored in a first memory coupled to a client computer system. It is appreciated that the training content can be loaded to the client computer system in any number of ways, for example with a CD-ROM or other portable data storage device.

At step 203, method 200 includes playing a portion of the web-based training content on the client computer system while the client computer system is off-line. For example, the client computer system is on an airplane or automobile, etc., where a connection to the host computer may not be available.

At step 205, method 200 includes storing results associated with playing the WBT content off-line in a memory device coupled to the client computer system. In one embodiment of the invention, the off-line play information is stored on the client computer system until the client computer system can connect with the host computer system.

At step 207, method 200 includes in response to detecting the client is online (e.g., a connection exists between the client computer system and the host computer system), synchronizing results of the off-line play with the host computer system. In one embodiment of the invention, the host computer system updates a client profile (e.g., an electronic transcript) with the client's play performance (e.g., test results, content played, time spent, etc.).

Figure 3:
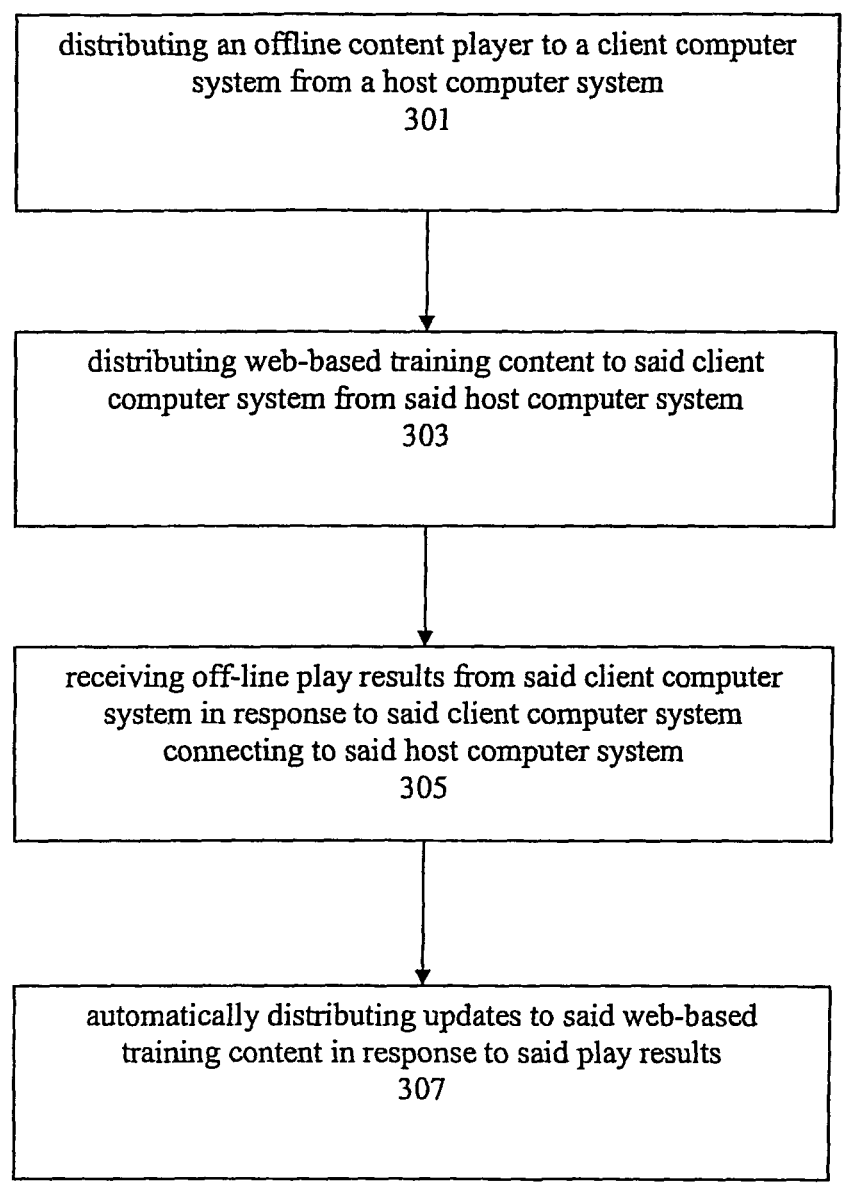
FIG. 3 is a flow diagram of an exemplary method for off-line web-based training from a host side in accordance with embodiments of the present invention.

FIG. 3 is a flow diagram of an exemplary computer controlled method 300 for off-line web-based training from a host side in accordance with embodiments of the present invention. At step 301, method 300 includes distributing an offline content player to a client computer system from a host computer system. In one embodiment of the invention, a client computer system performs a one-time download of the off-line player and installs the player on the client computer system. In one embodiment of the invention, a client computer system uses a web browser program to access a download web page. The download web page comprises a link pointing to the off-line content player.

In one embodiment of the invention, when the host computer downloads the WBTC to the client computer, the host computer system adds a unique file to the download package that can be used for uniquely identifying the user. The unique file facilitates result reporting and content display in the off-line player. In one embodiment of the invention, the unique file comprises XML and may also include subscription information such as download date, user local information, callback URL, user time zone, etc.

Figure 4:
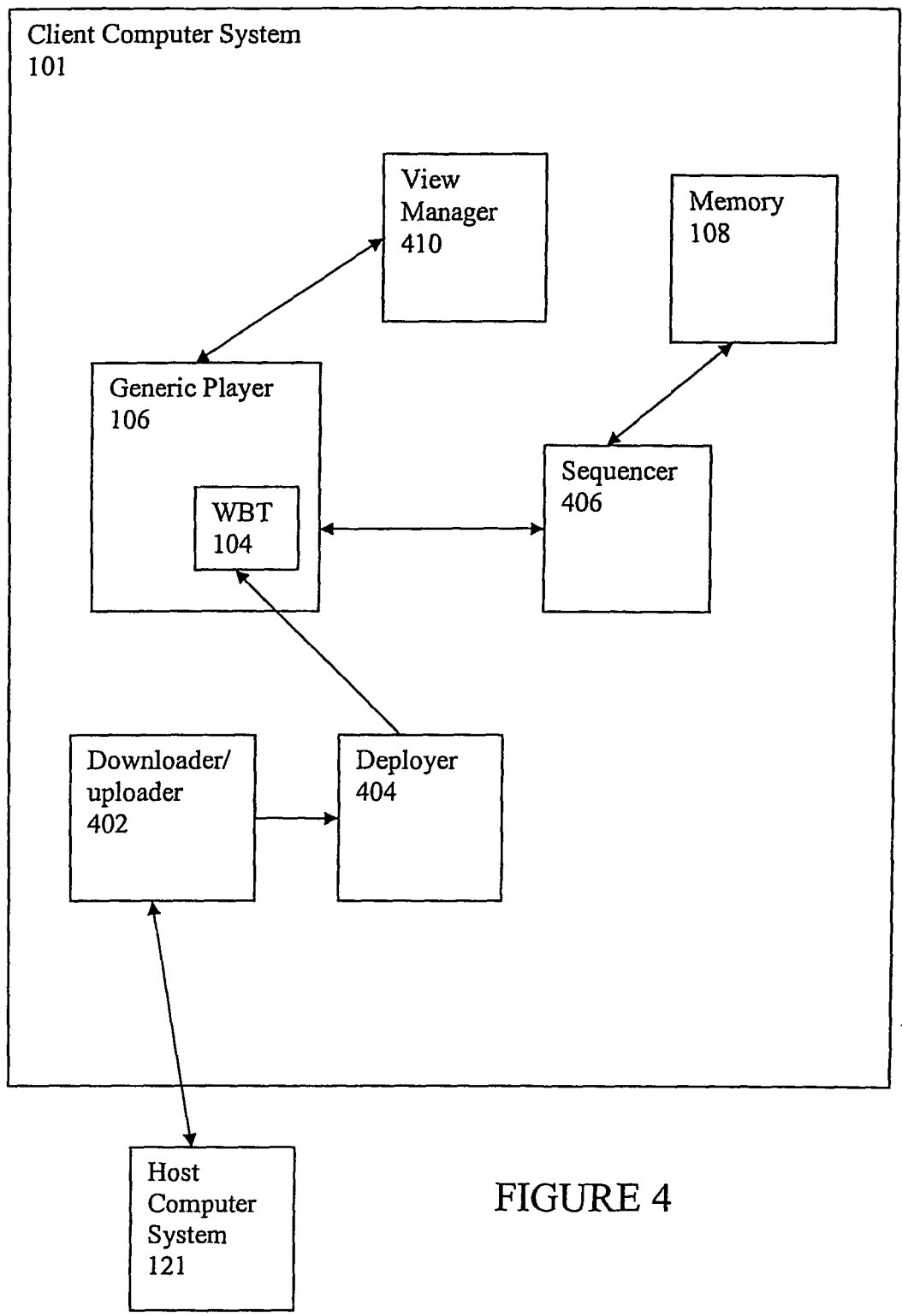
FIG. 4 is a block diagram of an exemplary client computer system for playing web-based training content while off-line in accordance with embodiments of the present invention.

FIG. 4 is a block diagram of an exemplary client computer system 101 for playing web-based training content while off-line in accordance with embodiments of the present invention. It is appreciated that the components of the client computer system may be part of the package initially downloaded to the client computer system from the host computer system. In one embodiment of the invention, the client computer system comprises a generic player 106 from the host computer system 121 and an uploader for uploading information (e.g., client off-line play results) to the host computer system 121.

In one embodiment of the invention, a deployer module 404 is responsible for importing content into the player 106 and for deleting content from the player 106. The player 106 is the module responsible for playing WBTC 104. In one embodiment of the invention, the player 106 is SCORM-based and can play a plurality of WBTC as long as it is provided in a SCORM package format. The player 106 calls the sequencer module 406 to get the next portion of content to display. The player 106 also calls the view manager 410 to appropriately set up user interface controls.

The sequencer module 406 is responsible for determining which portion of the WBTC 104 to display. In one embodiment of the invention, the sequencer is "smart" and makes decisions based on performance metrics associated with the user. In one embodiment of the invention, the sequencer 406 also determines what navigation icons are displayed on a toolbar associated with the player 106. In one embodiment of the invention, the sequencer 406 communicates this information to the view manager 410.

After off-line play and a connection is made between the client computer system 101 and the host computer system 121, off-line play results are uploaded from the memory 108 to the host computer system 121. In one embodiment of the invention, the sequencer module 406 comprises a synchronizer module (not shown) for synchronizing client data with the host computer system 121. In one embodiment of the invention, the client data comprises registration information and off-line play performance data (e.g., test results, content played, time spent, etc.), but could include any information associated with the client computer system 101.

In one embodiment of the invention, upon completion or failure of the result synchronization process, the synchronizer displays a localized success or error message. The synchronizer may generate a precise message for a variety of outcomes such as disconnection from the host, unreachable IP address, unknown host, etc.

Figure 5:
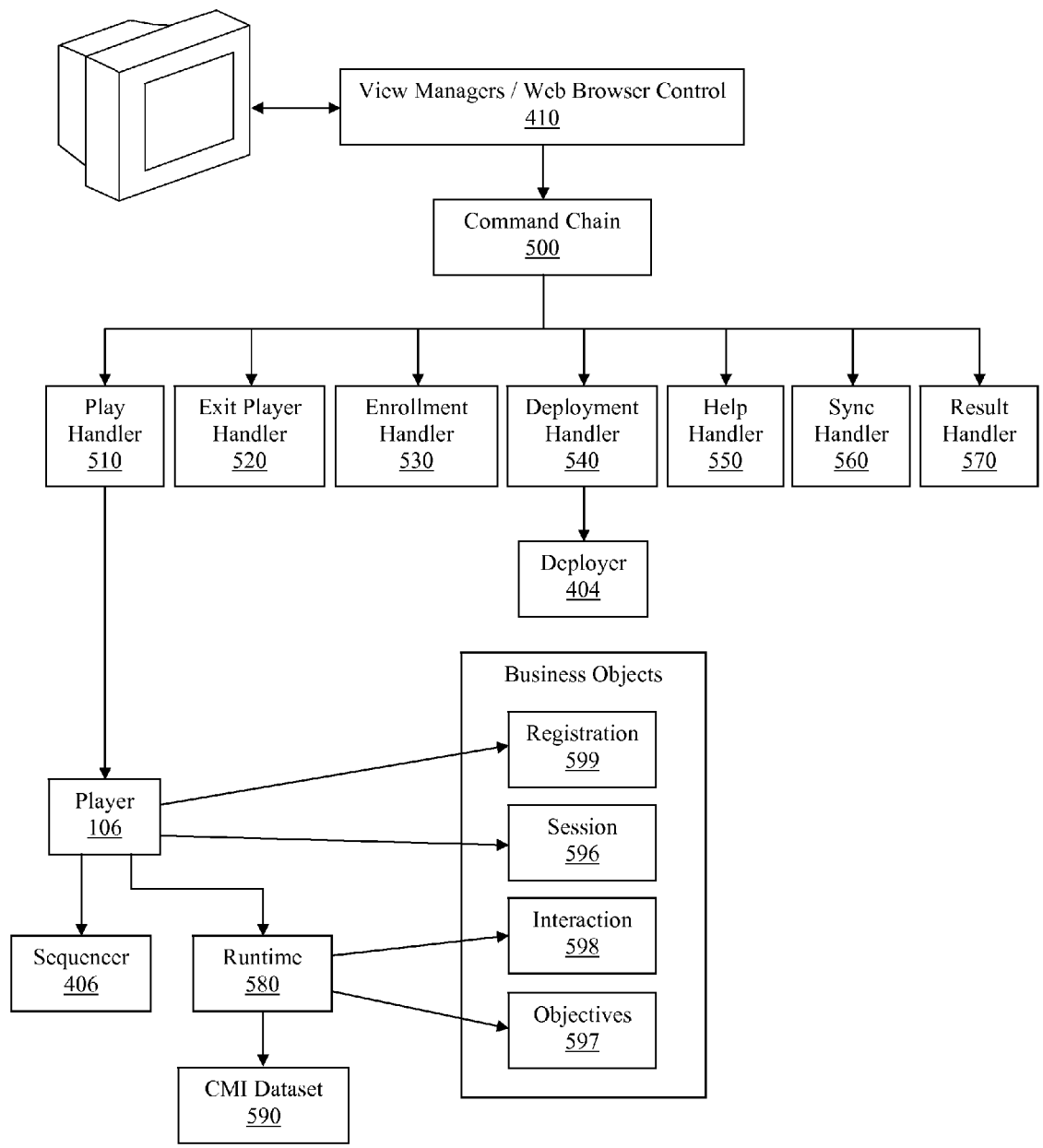
FIG. 5 is a block diagram of an exemplary system for off-line play of web-based training content including an exemplary command chain in accordance with embodiments of the present invention.

FIG. 5 is a block diagram of an exemplary system for off-line play of web-based training content including an exemplary command chain in accordance with embodiments of the present invention. In one embodiment of the invention, all user interface commands made through the view manager/web browser control 410 are sent through the command chain 500. In one embodiment of the invention, the command chain 500 includes a plurality of command handlers, each responsible for one or more commands.

The play handler 510 is responsible for playing web-based content. The exit play handler 520 is responsible for handling the event of closing the player. The enrollment handler 530 is responsible for displaying an aggregate view of all WBTC that has been downloaded and imported. In one embodiment of the invention, the enrollment view is a user interface that allows a user to view all WBTC that has been downloaded and imported and play, synchronize, or delete the content.

The deployment handler 540 handles the event of importing a package into the player and deleting a package from the player. The deployment handler 540 communicates with the deployer 404 to import/export content into the player.

The help handler 550 handles help and about menu items. The sync handler 560 handles the event of synchronization with the host computer system. The result handler handles viewing of results.

In one embodiment of the invention, the player 106 calls the sequencer 406 to get the next item to display. The runtime 580 is responsible for handling requests from the player 106 to log play results in the dataset 590. The player 106 accesses business objects 595 to determine registration information 599 and session data 595. The runtime 580 accesses business objects 595 to determine interaction information 598 and objectives 597.

Figure 6:
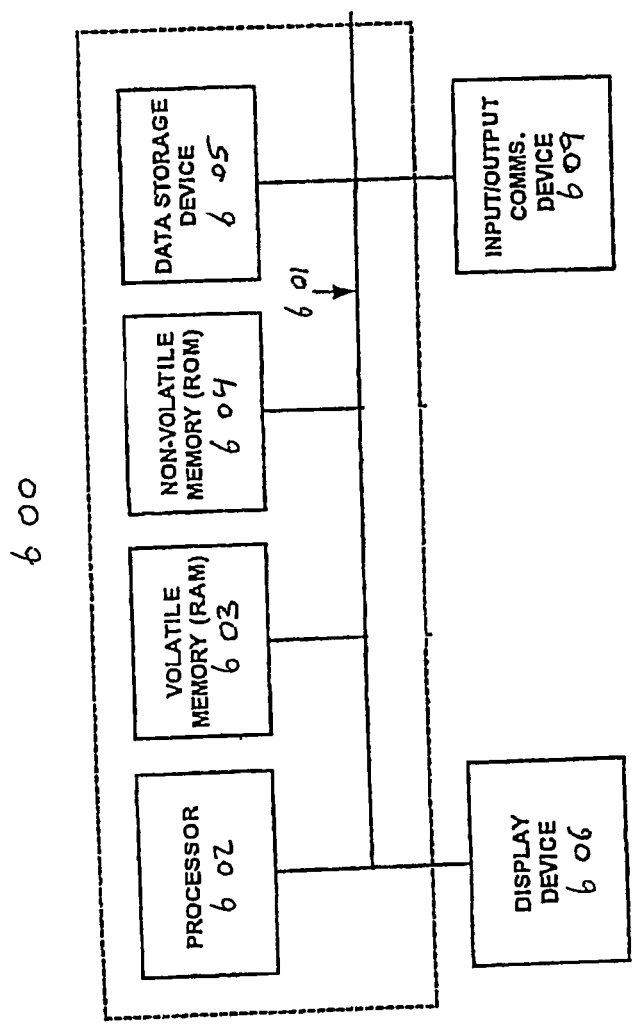
FIG. 6 is a block diagram of an exemplary computer system in accordance with embodiments of the present invention.

Referring now to FIG. 6, a block diagram of exemplary computer system 600 is shown. It is appreciated that computer system 600 of FIG. 6 described herein illustrates an exemplary configuration of an operational platform upon which embodiments of the present invention can be implemented. For example, computer system 600 may be similar to the exemplary client computer system 101 of FIG. 1 and/or similar to the host computer system 121 of FIG. 1. Nevertheless, other computer systems with differing configurations can also be used in place of computer system 600 within the scope of the present invention. For example, computer system 600 could be a server system (e.g., host computer system 121), a node on a network, a personal computer (e.g., client computer system 101) or an embedded computer system such as a mobile telephone or pager system. Furthermore, computer system 600 could be a multiprocessor computer system.

Computer system 600 includes an address/data bus 601 for communicating information, a central processor 602 coupled with bus 601 for processing information and instructions, a volatile memory unit 603 (e.g., random access memory, static RAM, dynamic RAM, etc.) coupled with bus 601 for storing information and instructions for central processor 602 and a non-volatile memory unit 604 (e.g., read only memory, programmable ROM, flash memory, EPROM, EEPROM, etc.) coupled with bus 601 for storing static information and instructions for processor 602. Computer system 600 may also contain an optional display device 606 coupled to bus 601 for displaying information to the computer user. Moreover, computer system 600 also includes a data storage device 605 (e.g., disk drive) for storing information and instructions.

Implementation Details

The following are examples of various data formats in accordance with embodiments of the present invention. It is appreciated that the following are exemplary and it is appreciated that any number of data formats can be used in accordance with embodiments of the present invention.

The following is an example of an exemplary data file containing data necessary for result reporting and content display in offline player. The file could be an XML document containing the following data:

1) Context ID—(This is the id of the context object. The context in which the content is accessed by the user. It encapsulates the user and the source from which s/he gets the access to the content.)
2) Subscription ID—(This is the id of the subscription object. Subscription defines the process of subscribing to a content. This object holds information about the content and the subscriber.)
3) Content_name—(Localized subscriber object name)
4) Owner_id—(id of the content inventory)
5) Owner_name—(name of the content inventory)
6) Learner_saba_id—(id of the learner who has downloaded the content)
7) Downloaded_on—(date/time when the content package was downloaded)
8) Culture—(locale information of the user)
9) runtime_data_learner_id—(unique identifier for the learner)
10) runtime_date_learner_name—(Full name (first name and last name) of the learner)
11) Callback URL—(This URL is used to synchronize results of a particular content package with Saba)

In one embodiment of the invention, the file could be encoded in UTF-8 format, but any format could be used.

Table I illustrates an exemplary format of the file in accordance with an embodiment of the present invention:

TABLE I

```
<?xml version="1.0" encoding="UTF-8"?>
<sabaini>
  <context_id>ctctx000000000001455</context_id>
  <subscription_id>ctnsr000000000001280</subscription_id>
  <content_name>content1</content_name>
  <owner>
    <id>cninv000000000001080</id>
    <name>content1</name>
    <part_no/>
  <owner>
  <learner_saba_id>emplo000000000001000<learner_saba_id>
  <downloaded_on>1099180513421</downloaded_on>
  <culture>en_US</culture>
  <runtime_data>
    <learner_id>uone</learner_id>
    <learner_name>User One</learner_name>
  <runtime_data>
  <callback_url>http://runni:80/Saba/AICCReporter?aiccSessionKey=
dcert3130386633633864353962 5E235E756F6E655E235E5361626153
6974655E235E656E5F55535E235E536162615E235E53414241302C0
21427293F991416C9A57D119E19C82CE10A8F3CD44202145AE9C
8681AB1E40EAFE4E12E02312970498C0
EFD-
content/cmiHACP.saba&session_id=cninv000000000001455&userId=u
one&content-type=SabaOffline
  </callback_url>
</sabaini>
```

Table II illustrates one example of an exemplary URL used to report results back to the LMS in accordance with embodiments of the present invention:

TABLE II

Table II is a sample Callback URL which is used while synchronizing results with Saba. It contains the following information:

1) id of the content inventory,
2) user id
3) type of content (which would be Offline)
4) certificate which contains authentication info to be able to login to Saba Application
5) encoded results information http://runni/Saba/AICCReporter?
session_id=cninv000000000001455
&userId=uone
&content-type=SabaOffline
&certificate=dcert3130386633633864353962 5E235E756F6E655E
235E5361626153697465 5E235E656E5F55535E235E536162615E
235E53414241302C021427293F991416C9A57D119E19C82CE10
A8F3CD44202145AE9C8681AB1E40EAFE4E12E02312970498C
0EFD
&data= [encoded CMI data]

Table III above contains the schema for storing the results as well as the actual results. The schema contains the various representations of the business objects that are needed to store the result information in accordance with embodiments of the invention. Below are exemplary business objects in accordance with embodiments of the present invention.

cnt_cmi_owner—This is a representation for owner of each of the packages imported in the player. The various elements are—
   id—a unique identifier for each entry
   name—name of the package
   part_no—not used currently
   is_synchronized—Boolean value for whether the data has been synchronized with Saba
   last_synchronized_on—the date when results were last synchronized with Saba
   saba_object_id—id of the content inventory
   created_on—date of creation of this entry
   updated_on—date when this entry was last updated cnt_cmi_package—This is a representation of each of the packages imported in the player. The various elements are—
   id—a unique identifier for each entry
   owner_id—points to the owner of the package in cnt_cmi_owner
   employee_saba_id—id of the user
   employee_username—unique identifier for the user
   employee_full_name—Full name of the user
   employee_culture—locale of the user
   context_id—This is the id of the context business object. The context in which the content is accessed by the user. It encapsulates the user and the source from which s/he gets the access to the content subscription_id—this is the id of the subscription object. Subscription defines the process of subscribing to a content. This object holds information about the content and the subscriber.
   registration_id—not used currently
   name—name of the content package
   downloaded_on—date on which the package was downloaded
   folder—folder name on the system where the content has been downloaded
   callback_url—URL used to synchronize results of this content package with Saba
   is_synchronized—Boolean value for whether the data has been synchronized with Saba
   last_synchronized_on—date on which the data was last synchronized with Saba
   saba_object_id—id of the content inventory created_on—date of creation of this entry
updated_on—date when this entry was last updated
cnt_cmi_registration—This is a representation of student's run-time data for an AU or SCO in the content that represents the [Core] group of the CMI data model.
Saba specific elements are—
id—a unique identifier for each entry
    package_id—pointer to the corresponding id in cnt_cmi_package
    activity_id—identifier of the current activity in a SCO
    total_attempts—total attempts of all the student's sessions in the SCO
    is_synchronized—Boolean value for whether the data has been synchronized with Saba
    last_synchronized_on—date on which the data was last synchronized with Saba
    saba_object_id—id of the content inventory
    created_on—date of creation of this entry
    updated_on—date when this entry was last updated
The following is the list of SCORM specific elements.
    lesson_status—current student status
    credit—indicates whether the SCO is for credit
    entry—indication of whether the student has been in the SCO before
    exit—an indication of how or why the student left the SCO.
    location—identifies the student's exit point which can be used by the SCO as an entry point the next time the student runs the SCO
    mode—identifies the SCO behavior desired after launch
    suspend_data—represents the [Core_Lesson] group of the CMI data model. Stored information from previous launch of the SCO which can be used in the current launch.
    total_time—total time of all the student's sessions in the SCO
    score_raw—raw score
    score_max—the maximum score that can be achieved in the SCO
    score_min—the minimum score that can be achieved in the SCO
cnt_cmi_session—This is a representation of student's run-time data representing the [Core] group of CMI data model for the single session.
Saba specific elements are—
    Id—a unique identifier for each entry
    registration_id—pointer to the corresponding entry in cnt_cmi_registration
    attempt_number—an integer value representing the current attempt
    is_synchronized—Boolean value for whether the data has been synchronized with Saba
    last_synchronized_on—date on which the data was last synchronized with Saba
    saba_object_id—id of the content inventory
    created_on—date of creation of this entry
    updated_on—date when this entry was last updated
The following is the list of SCORM specific elements.
    lesson_status—student status for the current attempt
    time—time the student has spent in the SCO.
    score_raw—raw score for the current attempt
    score_max—the maximum score that the student could have achieved in the current attempt
    score_min—the minimum score that the student could have achieved in the current attempt
cnt_cmi_comments_from_learner—This represents learner and LMS comments for a SCO.
Saba specific elements are—
    Id—a unique identifier for each entry
    registration_id—pointer to the corresponding entry in cnt_cmi_registration
    is_synchronized—Boolean value for whether the data has been synchronized with Saba
    last_synchronized_on—date on which the data was last synchronized with Saba
    saba_object_id—id of the content inventory
    created_on—date of creation of this entry
    updated_on—date when this entry was last updated
The following is the list of SCORM specific elements.
    comment—actual comment
cnt_cmi_learner_preference—This is a representation of the [Student_Preferences] group of the CMI data model.
Saba specific elements are—
    Id—a unique identifier for each entry
    registration_id—pointer to the corresponding entry in cnt_cmi_registration
    is_synchronized—Boolean value for whether the data has been synchronized with Saba
    last_synchronized_on—date on which the data was last synchronized with Saba
    saba_object_id—id of the content inventory
    created_on—date of creation of this entry
    updated_on—date when this entry was last updated
The following is the list of SCORM specific elements.
    Audio—indicator of the audio volume level or audio on-off.
    Text—identifies whether the audio text appears in the SCO
    Language—the language in which the content is delivered
    Speed—Indicator for the speed of the lesson flow
cnt_cmi_interaction—This is a representation of recognized and recordable input or group of inputs from the student.
Saba specific elements are—
    Id—a unique identifier for each entry
    session_id—pointer to owner entry in cnt_cmi_session
    date—date when the interaction was recorded
    description—stores the interaction question text
    is_synchronized—Boolean value for whether the data has been synchronized with Saba
    last_synchronized_on—date on which the data was last synchronized with Saba
    saba_object_id—id of the content inventory
    created_on—date of creation of this entry
    updated_on—date when this entry was last updated
    question_text—stores the interaction question text
The following is the list of SCORM specific elements.
    interaction_id—unique identifier for an interaction
    type—the type of interaction. Possible values are specified in the CMI data model doc
    time—time when the interaction took place.
    correct_response—correct response(s) for the interaction
    learner_response—learner response(s) for the interaction
    result—actual result from the learner's response
    weighting—identifies the importance of an interaction
    latency—time spent by the learner to complete the interaction
cnt_cmi_objective—This is a representation of the [Objectives_Status] group of the CMI data model.
Saba specific elements are—
    Id—a unique identifier for each entry
    registration_id—each objective is captured per registration. This is a pointer to the corresponding entry in cnt_cmi_registration
    is_synchronized—Boolean value for whether the data has been synchronized with Saba last_synchronized_on—date on which the data was last synchronized with Saba
saba_object_id—id of the content inventory
created_on—date of creation of this entry
updated_on—date when this entry was last updated The following is the list of SCORM specific elements.
objective_id—an internal identifier of the objective
status—status of the objective for a learner
score_raw—numerical score for an objective
score_max—maximum score that can be achieved for an objective
score_min—minimum score that can be achieved for an objective Embodiments of the present invention, a system and method for SCORM-based offline player processing and interaction have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing content on a computer system, said method comprising:
    downloading, to a first computer system, web-based training content from a second computer system, wherein said first computer system comprises:
        a content player, which is operable to play said web-based training content, wherein said content player, upon an initial download thereof, is installed on said first computer system, and wherein said initial download of said content player precedes said downloading said web-based training content to said first computer system; and
        one or more non-transitory memories, at least one of which comprises a web browser program stored therewith, wherein said web browser program is operable to access an initial content player download web page and wherein said initial content player download is performed in response to an action of said first computer system in relation to said initial content player download web page;
    determining a portion of said web-based training content based on information about a user;
    playing said determined portion of said web-based training content on said first computer system using said content player, wherein said content player, following said initial download thereof, performs said playing without a function of said web browser;
    storing results associated with said playing said portion of said web-based training content in one or more of said one or more memories of said first computer system;
    uploading said stored results to said second computer system;
    receiving, from said second computer system, an update to said web-based training content upon an automatic distribution thereof by said second computer in response to said uploading; and
    updating said web-based training content based on said receiving said update.

2. The method as described in claim 1, wherein said playing further comprising playing said portion of said web-based training content while said first computer system is offline, and further comprising:
    in response to detecting said first computer system is online, synchronizing said results with said second computer system.

3. The method as described in claim 1, wherein said web-based training content is substantially Sharable Courseware Object Reference Model (SCORM) compatible.

4. The method as described in claim 1 further comprising:
    in response to detecting said first computer system is online, updating a training transcript associated with said first computer system.

5. The method as described in claim 1 further comprising:
    in response to detecting said first computer system is online, automatically uploading updates associated with said web-based training content.

6. The method as described in claim 1, wherein said content player is a generic offline player.

7. The method as described in claim 1 further comprising:
    configuring user interface controls associated with said player.

8. The method as recited in claim 1 wherein said initial content player download webpage comprises a link, which points to a downloadable instance of said content player and wherein said action of said first computer system in relation to said initial content player web page comprises said first computer system activating said link.

9. A method for offline web-based training comprising:
    distributing a content player to a first computer system from a second computer system, wherein said first computer system comprises one or more non-transitory memories, at least one of which comprises a web browser program stored therewith, wherein said web browser is configured to interactively access an initial content player download web page, wherein said distributing said content player comprises:
        performing an initial download of said content player to said first computer system in response to an action of said first computer system in relation to said initial content player download web page; and
        upon said performing said initial download, installing said content player on said first computer system wherein, upon said installing thereof, said content player is operable for playing web based training content on said first computer system;
    distributing said web-based training content to said first computer system from said second computer system;
    playing at least a portion of said distributed web-based training content on said first computer system using said content player wherein said first computer is optionally online in relation to a communicative coupling with said second computer or offline in relation thereto and wherein, following said initial download thereof, said content player performs said playing at least said portion without a function of said web browser; and
    upon said playing at least a portion of said distributed web-based training content wherein said playing at least a portion is performed while said first computer is offline in relation to said communicative coupling with said second computer, storing results associated with said playing said portion of said web-based training content in one or more of said one or more memories of said first computer system;

receiving said stored offline play results from said first computer system in response to said first computer system connecting to said second computer system wherein, upon said connecting, said first computer is online in relation to said communicative coupling with said second computer; and automatically distributing, to said first computer system, an update to said web-based training content upon an uploading therefrom of said stored offline play results.

10. The method as described in claim 9, wherein said web-based training content is substantially Sharable Courseware Object Reference Model (SCORM) compatible.

11. The method as described in claim 9, wherein said content player is generic and compatible with a plurality of SCORM content.

12. The method as described in claim 9, further comprising:
determining a subsequent play pattern of said web-based content based on said off-line play results.

13. The method as described in claim 9, wherein said first computer system is operable to connect to said second computer system over the Internet.

14. The method as described in claim 9, wherein said off-line play results comprises Extensible Markup Language (XML).

15. A system for offline web-based training comprised of a first computer system and a second computer system, the training system further comprising:
a first component operable for playing web-based training content on said first computer system while said first computer system is optionally online or offline in relation to a communicative coupling with said second computer system, wherein said system for offline web based training comprises a component of said first computer system,
wherein said first computer system comprises one or more non-transitory memories and wherein at least one of said one or more memories comprises a web browser program stored therewith, wherein said web browser program is operable to access a web page for performing an initial download of said first component, wherein said performing said initial first component download is performed in response to an action of said first computer system in relation to said initial first component download web page,
wherein upon said initial download thereof, said first component is installed initially on said first computer system and wherein upon said initial installation, said first component is operable for performing said playing said web based training content without a function of said web browser program;
a second component operable for downloading web-based training content, for storing said web-based content in one or more of the one or more memories of said first computer system, wherein said second component is also operable for uploading said stored results to said second computer system and, upon receiving from said second computer system an update to said web-based training content upon an automatic distribution thereof by said second computer in response to said uploading said stored results thereto, and wherein said second component is further operable for updating said web-based training content based on said receiving said update;
a third component operable to store, in one or more of the one or more memories of said first computer system, results associated with an offline play of a portion of said web-based training content;
a fourth component operable to upload said results to a said second computer system in response to detecting a connection between said first computer system and said second computer system wherein, upon said connection, said first computer is online in relation to said communicative coupling with said second computer; and
a fifth component operable to determine said portion of said web-based training content based on information about a user.

16. The system as described in claim 15, wherein said web-based training content is Sharable Courseware Object Reference Model (SCORM) compatible.

17. The system as described in claim 15, wherein said first component is Sharable Courseware Object Reference Model (SCORM) compatible.

18. The system as described in claim 15, wherein said connection between said first computer system and said second computer system is over the Internet.

19. The system as described in claim 15, wherein said second component is operable to automatically download second web-based training content in response to detecting said connection between said first computer system and said second computer system.

20. The system as described in claim 15, wherein said first component is operable to automatically determine a play pattern for subsequent training based on said results.

21. A system for offline web-based training comprised of a first computer system and a second computer system, the training system further comprising:
a first component operable for initially downloading a content player to said first computer system, wherein said content player is operable for playing web-based training content on said first computer system while said first computer system is optionally online or offline in relation to a communicative coupling with said second computer system, and wherein said content player, upon said initially downloading, is installed on said first computer system, and wherein said installation of said content player on said first computer system is performed prior to said content player performing said playing said web based training content on said first computer system;
wherein said first computer system comprises one or more non-transitory memories, at least one of which comprises a web browser program stored therewith, wherein said first component is operable with said web browser program, which functions to access an initial content player download web page and wherein said initially downloading said content player is performed in response to an action of said first computer system in relation to said initial content player download web page wherein, upon said initially downloading thereof, said content player performs said playing without a function of said web browser program;
a second component operable to download said web-based training content to said first computer system;
a third component operable to automatically upload stored results associated with off-line play of a portion of said web-based training content, to said second computer system in response to detecting a connection between said first computer system and a second computer system, wherein offline play is performed when said first computer system is offline and, upon said connection, said first computer is online, in relation to said communicative coupling, wherein one or more of said second component or said third component are further operable for:
receiving, from said second computer system, an update to said web-based training content upon an automatic distribution thereof by said second computer in response to said uploading; and
updating said web-based training content based on said receiving said update; and
a fourth component operable to determine said portion of said web-based training content based on information about a user.

22. The system as described in claim 21 further comprising:
a fifth component operable to store said results of said offline play wherein said fifth component is related to one or more of said one or more memories.

23. The system as described in claim 21, wherein said web-based training content is Sharable Courseware Object Reference Model (SCORM) compatible.

24. The system as described in claim 21, wherein said content player is Sharable Courseware Object Reference Model (SCORM) compatible.

25. The system as described in claim 21, wherein said connection between said first computer system and said second computer system is over the Internet.

26. The system as described in claim 21, wherein said first component is further operable to automatically download updates associated with said content player to said first computer system in response to detecting said connection between said first computer system and said second computer system.

27. The system as described in claim 21, wherein said second component is further operable to automatically download second web-based training content to said first computer system in response to detecting said connection between said first computer system and said second computer system.

* * * * *